United States Patent [19]

Hronchek

[11] 4,339,649
[45] Jul. 13, 1982

[54] APPARATUS AND METHOD FOR R-C TIME CONSTANT CIRCUIT

[75] Inventor: James A. Hronchek, Kokomo, Ind.

[73] Assignee: Emhart Industries, Inc., Indianapolis, Ind.

[21] Appl. No.: 156,122

[22] Filed: Jun. 3, 1980

[51] Int. Cl.³ .............................................. H05B 1/02
[52] U.S. Cl. .............................. 219/10.55 B; 219/505; 219/497; 219/506; 219/492; 323/242
[58] Field of Search ......... 219/492, 493, 497, 10.55 B, 219/10.55 E, 10.55 F; 307/117, 99; 323/22.5 C, 18, 24, 242, 235; 236/46 F

[56] References Cited

U.S. PATENT DOCUMENTS

| | | | |
|---|---|---|---|
| 3,509,322 | 4/1970 | Lundin | 219/492 X |
| 4,012,617 | 3/1977 | Burke et al. | 219/10.55 B |
| 4,015,145 | 3/1977 | Stewart | 219/492 |
| 4,121,149 | 10/1978 | Seltzer | 219/10.55 B |
| 4,172,982 | 10/1979 | Kompelien | 219/492 |
| 4,196,356 | 1/1980 | Kabat | 219/492 |

FOREIGN PATENT DOCUMENTS

| | | | |
|---|---|---|---|
| 2731782 | 1/1979 | Fed. Rep. of Germany | 219/492 |
| 52-1736 | 1/1977 | Japan | 219/10.55 B |

Primary Examiner—B. A. Reynolds
Assistant Examiner—M. H. Paschall
Attorney, Agent, or Firm—Robert F. Meyer; David W. Gomes

[57] ABSTRACT

In a time constant circuit of the type having a resistance capacitance circuit including a capacitor and a resistance network connected in series with the capacitor, wherein the improvement provides digital gate means having an output and at least one input, the output being electrically coupled to the resistance capacitance circuit, the digital gate means being adapted to provide a first digital output voltage level for charging the capacitor through the resistance network and a second digital output voltage level for discharging the capacitor through the resistance network, and circuitry connected to the input of the digital gate for controlling the output of the gate in response to the voltage charge of the capacitor.

5 Claims, 4 Drawing Figures

APPARATUS AND METHOD FOR R-C TIME CONSTANT CIRCUIT

BACKGROUND OF THE INVENTION

1. Field of the Invention

The present invention generally relates to R-C time constant circuits and, in particular, to such circuits as used to control the duty cycle of a microwave oven power source.

2. Statement of the Prior Art

Resistance-capacitance time constant circuits are well known and have been widely used in various electrical and electronic applications. One particular application in which they have proven to be useful is that of controlling the duty cycle of a microwave oven power source. One reason for this usefulness is that R-C time constant circuits provide more precise timing than the mechanical timers used for a wide variety of appliances and other applications. In addition to the need for accurate control, it is often desirable that the duty cycle be controlably variable.

SUMMARY OF THE INVENTION

Accordingly, the present invention presents an improved time constant circuit of the type having a resistance-capacitance circuit including a capacitor and a resistor network connected in series with the capacitor, wherein the improvements comprises: digital gate means having an output and at least one input, the output being electrically coupled to the resistance-capacitance circuit, the digital gate means being adapted to provide a first digital output voltage level for charging the capacitor through the resistance network and a second digital output voltage level for discharging the capacitor through the resistance network; and, circuit means connected to the input of the digital gate means for controlling the output of the gate means in response to the voltage charge of the capacitor. Further, the present invention provides a method for controlling the duty cycle of a microwave power source with a time constant circuit having a resistance-capacitance circuit including a capacitor and a resistance network connected in series with the capacitor, comprising the steps of: biasing the resistance-capacitance circuit with a digital gate means, using a first digital voltage level to charge the capacitor through the resistance network and a second digital voltage level to discharge the capacitor through the resistance network; and, controlling the output of the digital gate means in response to the charge on the capacitor.

BRIEF DESCRIPTION OF THE DRAWINGS

The present invention is illustratively shown and described in reference to the appended drawings in which.

DESCRIPTION OF THE PREFERRED EMBODIMENTS

Figure 1:
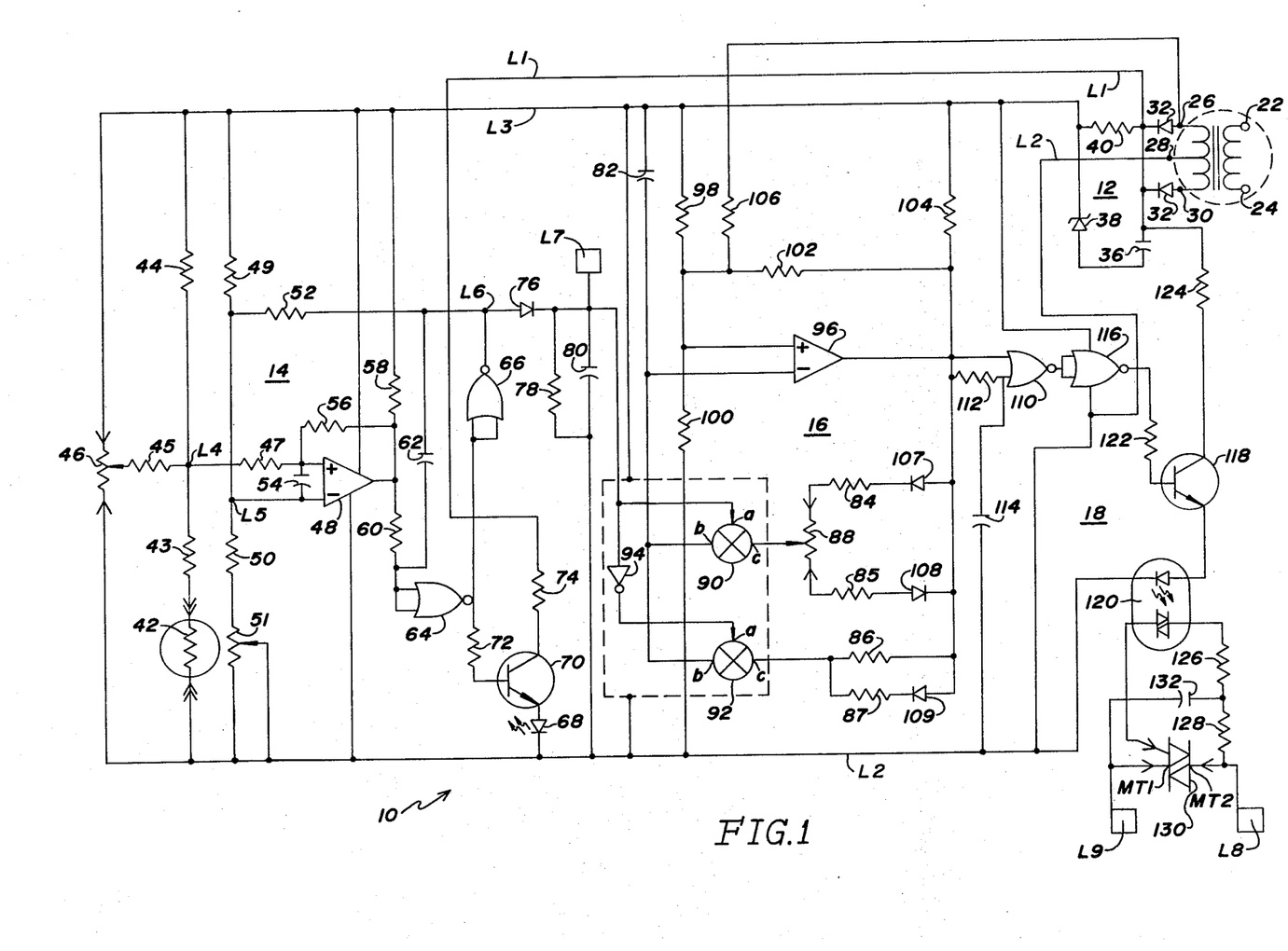
FIG. 1 is a schematic diagram of a control circuit for a microwave oven, which control circuit includes an R-C time constant circuit.

A time constant circuit is included in FIG. 1 which is a power control circuit for the heat source of an oven (not shown), which in this case is a microwave oven. The control circuit 10 includes a power supply section 12, a temperature sensing section 14, a duty cycle control section 16, and an output section 18.

More specifically, the power supply section 12 includes a transformer 20 having input terminals 22 and 24 for connecting the transformer to a source of line voltage such as a 120 VAC supply. Transformer 20 includes output terminals 26, 28 and 30. Diodes 32 and 34 are connected to output terminals 26 and 30 respectively to rectify the alternating voltage from the transformer into a direct current voltage for power supply lines L1 and L2, line L1 having a positive DC voltage with respect to line L2. A capacitor 36 is connected between lines L1 and L2 to smooth out the resulting DC signal thereon. A zener diode 38 is connected in series with a voltage dropping resistor 40, which series network is in turn connected across lines L1 and L2 for creating a regulated DC voltage supply on line L3 with respect to line L2. Zener diode 38 is connected in the reverse bias mode between lines L3 and L2 and a typical value for the reverse bias breakdown voltage thereof is 9.1 volts.

The temperature sensing section 14 of the circuit 10 is intended for use with a thermistor temperature probe 42. The thermistor probe 42 is biased by a network of resistors 43, 44, 45 and a potentiometer 46 which is connected across the regulated power lines L3 and L2. The thermistor 42, resistors 43 and 44 are connected in series across the lines L3 and L2. The potentiometer includes two end terminals which are connected across lines L3 and L2 and a variable wiper terminal which is connected to one end of resistor 45. The other end of resistor 45 is connected to the junction L4 of resistors 43 and 44. The junction L4 is connected through resistor 47 to the positive input of an operational amplifier 48. Reference voltage network including resistors 49, 50 and a potentiometer 51 are also connected across the regulated voltage supply of L3 and L2. Resistors 49 and 50 are connected in series and to one of the fixed terminals of potentiometers 51. Potentiometer 51 is connected in a simple variable resistor mode with the other fixed terminal connected to the variable terminal which in turn are connected to the line L2. The connection L5 between resistors 49 and 50 is connected to the negative input of operational amplifier 48. An additional resistor 52 has one end connected to the junction point L5 and functionally serves as part of the reference voltage supply. Resistor 52 is further discussed below. A small capacitor 54 is connected between the positive and negative inputs of operational amplifier 48 for the purpose of filtering spurious signals therefrom. Connected as such, operational amplifier 48 operates as a voltage comparator.

A pair of resistors 56 and 58 each has one end connected to the output of operational amplifier 48. The other end of resistor 56 is connected to the positive input of amplifier 48 and the other end of resistor 58 is connected to the positive supply line L3. The resistors 47 and 56 serve to determine the hysteresis factor of the operational amplifier 48. A resistor 60 and a capacitor 62 are connected in series. The free end of resistor 60 is connected to the output of amplifier 48 and the free end of capacitor 62 is connected to the other end of the resistor 52. The junction between resistor 60 and capacitor 62 is connected to the input of an inverter 64. In the embodiment shown, the inverter 64 is a dual input NOR gate having its inputs tied together. The output of NOR gate or inverter 64 is connected to another inverter or NOR gate 66 having the inputs similarly tied together. The output of inverter 66 is also connected to the junction between capacitor 62 and resistor 52.

Visual output means are connected to the output of inverter 64 in the form of a light emitting diode 68 driven by a transistor 70 and resistors 72 and 74. The resistor 72 is connected between the output of inverter 64 and the base of transistor 70. The resistor 74 is connected between the supply line L1 and the collector of transistor 70 and the light emitting diode has its anode connected to the emitter of transistor 70 and its cathode connected to the DC return line L2.

An output delay means is connected to the junction L6 and takes the form of a diode 76 connected in series with the parallel combination of a resistor 78 and a capacitor 80. The parallel combination is also connected to the DC return line L2. The junction L7 of the diode 76 and the capacitor-resistor network of 78 and 80 forms the output terminals for the temperature sensing section 14 of the circuit 10.

In operation, the temperature sensing section 14 functions in the following manner. The resistance network of 43, 44, 45 and 46 establishes the biasing for the thermistor temperature probe 42. The output of the thermistor and biasing resistor network appears at the terminal L4 and is a signal which represents the relationship between the temperature being experienced by the probe 42 and the set point temperature determined by the potentiometer 46. This output signal is fed through resistor 47 to the positive input of operational amplifier 48. The resistors 49, 50, 51 and 52 establish a reference voltage against which the output of the thermistor network is compared. Before heating operations begin, the voltage at L4 is normally a positive voltage as the resistance of the thermistor is high and thus the output signal of amplifier 48 is a high DC voltage. The double inversion effect of inverters 64 and 66 causes a logical high voltage to appear at the terminal L6. The positive DC voltage representing the logical high affects the current flowing through resistor 52 which, in combination with other reference voltage resistors 49-51, establishes a specific reference voltage for the negative input of operational amplifier 48. In one embodiment, this first reference voltage is determined to represent a temperature which is 5° F. below the set point temperature established by potentiometer 46.

As the temperature of the item being heated or the temperature experienced by the probe 42 increases, the resistance of the probe 42 decreases and thus the voltage at L4 also decreases. When the voltage presented at the positive input of amplifier 48 drops below the reference voltage established at the negative input thereof, the output of amplifier 48 goes from a positive voltage to zero volts. This causes the output signal at terminal L6 to go from a logical high signal to a logical low signal, which in this case is zero volts. The effect of this is to change the voltage connected to resistor 52 and thus to change the biasing voltage presented to the negative terminal of amplifier 48. In the described embodiment, this causes that reference voltage to be lowered. In this manner, the reference voltage is changed, effectually changing the reference temperature against which the output of the probe network is being compared. Thusly, the single operational amplifier 48 may be used to check for more than one temperature. In the described embodiment, the second temperature to be detected is the set point temperature as determined by potentiometer 46. Thus, as the temperature of the item being heated, or the temperature of the probe 42, increases, the voltage at L4 continues to drop and eventually passes the reference voltage established at the negative input of amplifier 48. As used, the present embodiment first tests for a temperature which is 5° below the set temperature, that is, what may be termed a secondary temperature, and then tests for the set point temperature.

Thusly, while the probe temperature is below the first temperature to be sensed or tested for, that is, while the probe temperature is more than a predetermined number of degrees away from the set point temperature, the output of the operational amplifier 48 is a positive voltage causing the output of inverter 66 to likewise be a positive logic signal. Once the temperature of the probe 42 reaches, equals or is greater than the set point temperature, the output of amplifier 48 is a negative voltage representing a logical zero which is likewise held by the output of the inverter 66.

The other possible condition for the temperature of probe 42 is that it be between the set point temperature and the secondary temperature, 5° F. below the set point temperature. In other words, this is when the set point temperature is less than a predetermined number of degrees away from the set point temperature. During this time, the output of the operational amplifier 48, as well as the output signal at terminal L6, are oscillating between a positive voltage and zero volts, or a logical high and a logical low, respectively. More specifically, when the probe temperatures reaches the secondary temperature or 5° below the set point temperature, the output of amplifier 48 changes from a positive voltage to zero volts. This causes the output of inverter 64 to change from a logical low to a logical high and the output of inverter 66 to change from a logical high to a logical low. This causes the biasing at the negative input of amplifier 48 to be changed from the secondary temperature to the set point temperature. As a result of this change, the output voltage from L4, or the voltage presented at the positive input, is higher than the lowered reference voltage presented at the negative input. This causes the output of amplifier 48 to change back to a positive voltage with corresponding changes to the output of inverters 64 and 66. This, in turn, changes the biasing of amplifier 48 to that of the secondary temperature and the process repeats. Thusly, with the probe temperature between the set point and secondary temperatures, the output signal from the operational amplifier 48 and the output terminal L6 are both oscillating. These oscillations are controlled by the combination of the resistor 60 and the capacitor 62.

An indicator of the output of the temperature sensing section is visually given by the light emitting diode 68. The output of inverter 64 controls the NPN transistor 70 which in turn powers the diode 68. When the output of amplifier 48 is a positive voltage, the output of inverter 64 is a logical zero and thus the transistor 70 is nonconducting. This causes the light emitting diode to remain off. When the output of amplifier 48 is zero volts, the output of inverter 64 is a logical high which in turn causes transistor 70 to conduct and turns diode 68 on. For the given embodiment, while the probe temperature is below the secondary temperature, light emitting diode 68 remains off. When the probe temperature is above the set point temperature, light emitting diode 68 remains on. When the probe temperature is between the secondary temperature and the set point temperature, the diode 68 oscillates between on and off in accordance with the oscillations of the output of amplifier 48. Thusly, as the probe temperature or the temperature of the item being heated reaches the temperature range determined between the set point temperature and the secondary temperature, the light emitting diode flashes on and off giving the oven operator a preliminary indication that the item being heated is almost at the set point temperature.

To prevent the oscillating of the signal at terminal L6 from causing any difficulties in the remainder of the control circuit, the delay circuit of diode 76, resistor 78 and capacitor 80 blocks the oscillations from reaching the output terminal of L7. While the probe temperature is below the secondary temperature, the positive logic high at the output of inverter 66 charges the capacitor 80 through diode 76. When the probe temperature reaches the secondary temperature, the capacitor discharges through resistor 78 during those periods when the diode 76 is reverse biased. Because of the oscillating nature of the output while the probe temperature is between the set point temperature and the secondary temperature, the capacitor 80 does not have ample opportunity to discharge and thus the output at L7 remains logically high. Once the probe temperature reaches the set point temperature, the output of inverter 66 remains at a logical zero for a longer period of time, giving the capacitor 78 sufficient time to discharge through the resistor 78 and thus allowing the output at line L7 to drop to a logical low or zero volts.

The duty cycle control section 16 generally includes a capacitor 82 connected in series with a resistance network including resistors 84, 85, 86 and 87. This combination functions in the same manner as an R-C time constant circuit by charging and discharging the capacitor 82 through the enumerated resistors 84–87. One end of the capacitor 82 is connected to the regulated voltage potential of L3. The other end of capacitor 82 is connected through a pair of bilateral semiconductor switching devices 90 and 92 to the resistor network of 84–88. The bilateral semiconductor switching devices are controlled by the output from L7 of the temperature sensing circuit and are used to determine which group of resistors 84, 85 and 88 or 86 and 87 will be used for the charging and discharging of the capacitor 82. The switching devices 90 and 92 may include any conventional switches capable of controlling or switching analog signals. In one embodiment, the devices 90 and 92 are transmission gates. When a logical one or high signal is applied to the terminal "a" of either of the gates, that gate closes thereby transmitting the analog signal between its terminals "b" and "c". As long as a logical low signal is applied at the input "a", the transmission gates remain open or nontransmissive. As mentioned, the gates 90 and 92 are controlled by the signal from the temperature sensing circuit presented at L7. L7 is connected to the input of an inverter 94 and to the control terminal "a" of gate 90. The output of inverter 94 is connected to control terminal "a" of transmission gate 92. In this manner, either one or the other of the gates 90 and 92 is turned on while the other gate is turned off.

The two gates 90 and 92 may neither be simultaneously or nor simultaneously off. Thusly, as the temperature probe indicates a temperature below the set point temperature and the signal at L7 is a logical high, the transmission gate 90 is open thus causing the capacitor 82 to be charged and discharged through the resistors 84, 85 and 88. When the signal at terminal L7 is a logical low, as when the thermistor probe indicates a temperature above the set point temperature, the gate 90 is off or open and the gate 92 is on or closed, thus causing the charge and discharge of capacitor 82 to take place through resistors 86 and 87.

An operational amplifier 96 has its negative input connected to the junction of the capacitor 82 and the "b" terminal inputs of gates 90 and 92. A voltage divider including resistors 98 and 100 is connected across the regulated voltage supply of lines L3 and L2. The junction between resistors 98 and 100 is connected to the positive input of amplifier 96. Resistor 102 is connected in the feedback mode between the output of amplifier 96 and the positive input thereof. An additional resistor 104 is connected between the output of amplifier 96 and the positive regulated supply line of L3. Another resistor 107 is connected from the alternating current side of diode 32 to the positive input of amplifier 96 to enable that circuit to function as a crest detector. This function is described further below. The resistors 84, 85 and 87 are each electrically coupled to the output of amplifier 96 through diodes 107, 108 and 109. The diodes 107 109 control the direction of current through their respectively connected resistors, and thus control which resistors are functional during the charging and discharging operation of capacitor 82. The resistor 86 is connected directly to the output of amplifier 96. The output of amplifier 96 is also connected to a dual input NOR gate 110 at one input thereof. The other input of gate 110 is coupled to the output of amplifier 96 through a resistor 112. A capacitor 114 is connected between the gate side of resistor 112 and the DC return line L2. The resistor 112 and capacitor 114 serve as a "100%" makeup circuit for the R-C time constant circuit 16. The output of gate 110 is connected to both inputs of another dual input NOR gate 116.

In operation, the duty cycle control section 16 functions in the following manner. As mentioned, the output of the temperature sensing circuit 14 derived from terminal L7 controls the switching gates 90 and 92. While the temperature of the probe 42 is below the secondary temperature, the input at terminal "a" of gate 90 in a logical high thus connecting the resistor network of 84, 85 and 88 to the capacitor 82. The diodes 107 and 108 control the direction of current through the resistors 84 and 85 thus causing the capacitor 82 to receive charging current through resistor 85 and a portion of potentiometer 88 and to discharge by current flowing through the resistor 84 and a portion of the potentiometer 88. By this means, the potentiometer 88 controls the duty cycle of the time constant circuit 16. The amount of resistance present in both the charging and discharging paths determines the respective charging and discharging time constants for the capacitor 82.

Because of the delay or blocking function of capacitor 80 and resistor 78, the output at L7 remains a logical high until the temperature of probe 42 is equal to or greater than the set point temperature. At this time, the gate 90 goes off or opens while the gate 92 goes on or closes, thus causing subsequent discharge and charge operations for the capacitor 82 to take place through the resistors 86 and 87. The charging of capacitor 82 takes place through resistor 86 while the discharging takes place through both resistors 86 and 87. The time constant of this latter arrangement is determined at approximately 35% while the time constant of the arrangement using resistors 84, 85, and 88 is variable between approximately 99% and 35%. The 100% makeup circuit including resistor 112 and capacitor 114 adds an additional 1% to each of the time constant arrangements, thus making the power variable between 36 and 100% during the full power heating mode of the oven or a constant of 36% during the "keep warm" mode of the oven. The signal to turn on the heat source, which in this case is a microwave power source, is represented by a positive voltage output signal from amplifier 96. This appears at the output of inverter gate 116 as a logical high signal. The signal to turn the heat source off is a zero or negative signal at the output of amplifier 96 which is represented as a logical zero at the output of gate 116.

The output section 18 includes a transistor 118 which drives an optically coupled triac 120. The output of inverter gate 116 is connected through a resistor 122 to the base of transistor 118. The collector of transistor 118 is connected through a resistor 124 to the positive voltage supply line L1. The emitter of transistor 118 is connected to the anode of the light emitting diode of optically coupled triac 120. The cathode of the diode of optically coupled triac 120 is connected to the DC return line L2. Triac 120 includes a first main terminal MT1 and a second main terminal MT2. Terminal MT1 is connected through a pair of series connected resistors 126 and 128 to a control line L8 of a heat source (not shown). The line L8 is connected to one main terminal MT2' of a triac 130. The other main terminal MT1' is connected to another control line L9 for the oven heat source. The gate terminal of triac 130 is connected to MT2 of the optically coupled triac 120. A capacitor 132 is connected between the junction of resistors 126 and 128 and the control line L8. In this manner, a heat source may be connected to a power supply through the lines L8 and L9 to allow the power therefor to be controlled by the triac 130.

In operation, a logical high signal from the output of inverter 116 turns on transistor 118 which lights the light emitting diode of optically coupled triac 120. This turns on the triac which supplies voltage to the gate terminal of triac 130 to close the connection between control lines L8 and L9. A change of the output from the inverter 116 from a logical high to a logical low causes the turning off of transistor 118, the extinguishing of the diode of the optically coupled triac and the subsequent turning off of the triac 130.

Figure 2:
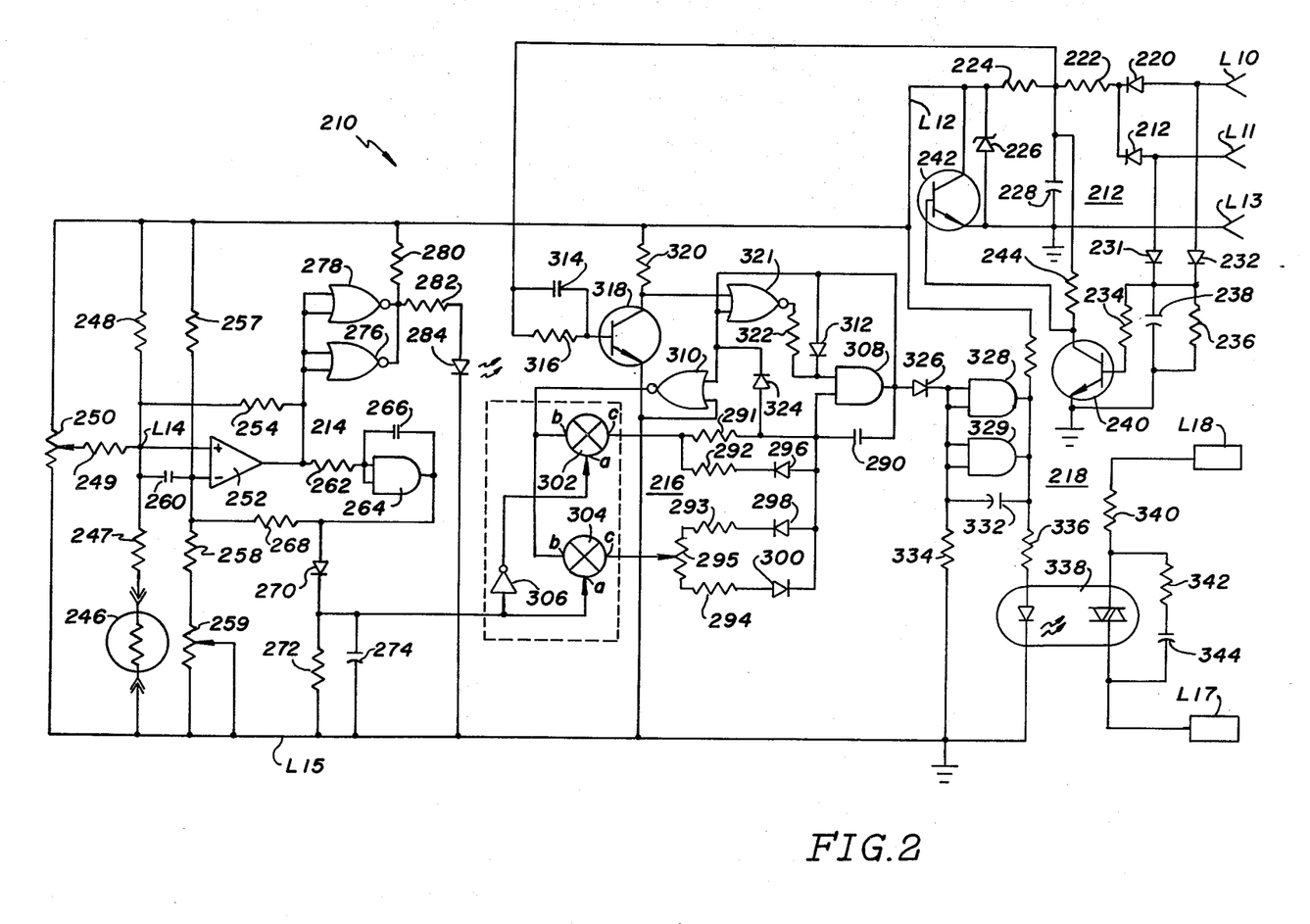
FIG. 2 is a schematic diagram of another microwave oven control circuit including one embodiment of the present invention.

FIG. 2 shows a schematic diagram of another control circuit 210 for a microwave oven which circuit 210 includes an embodiment of the present invention. The circuit 210 generally includes a power supply section 212, a temperature sensing section 214, a duty cycle control section for the microwave power source 216, and a control output section 218.

More specifically, the power supply section 212 includes means for inputting an alternating voltage power signal on lines L10 and L11. A pair of diodes 220 and 221 are connected to lines L10 and L11 respectively for rectifying the AC signal thereof into a DC signal. The cathodes of diodes 220 and 221 are connected together and to one end of a voltage dropping resistor 222. The other end of resistor 222 is connected to another resistor 224. The other end of resistor 224 forms the output line L12 for the power supply section 212. A zener diode 226 is connected in the reverse bias mode between the DC line L12 and an AC return L13 for purposes of voltage regulation. A filtering capacitor 228 is connected between the junction of resistors 222 and 224 and the AC return line L13. The power supply section 212 further includes another pair of diodes 230 and 231 each of which has its anode connected to one of the AC input lines L10 and L11. The cathodes of diodes 231 and 232 are connected in common and two resistors 234 and 236 and a capacitor 238 each has one lead connected to that common connection. The other ends of the resistor 236 and capacitor 238 are connected together and to a ground representing the AC return line L13. A transistor 240 has its emitter connected to the same ground and its base connected to the other end of resistor 234. The collector of transistor 240 is connected to the base of another transistor 242 which has its emitter connected to the AC return line L13 and its collector connected to the regulated DC voltage supply line L12. The collector of transistor 240 is also connected through a resistor 244 to the connection between resistors 222 and 224. The components enumerated between 231 and 244 act to ground the regulated DC voltage supply line L12 when the circuit is deenergized for the purpose of discharging certain capacitors to remove the shock hazard therefrom. When the circuit 210 is energized, the transistor 240 is turned on resulting in the transistor 242 being turned off. When the circuit is deenergized, this situation reverses causing the line L12 to temporarily be connected to the AC return line L13 but for the approximately 0.5 volts between the emitter and collector junctions of transistor 242.

The temperature sensing section 214 includes a thermistor temperature probe 246 similar to the temperature probe 242 of FIG. 1. Also included is a biasing and set point temperature determination means including a resistance network with resistors 247 through 250. This biasing and set point determination means operates in the same manner that is described for FIG. 1. The temperature sensing section 214 also includes an operational amplifier 252 having its positive input connected to the junction L14 between resistors 247, 248 and 249. Operational amplifier 252 acts as a voltage comparator in the same manner as amplifier 48 of FIG. 1. A further resistor 254 is connected between the output and the positive input of the amplifier 252 to determine the gain of the positive input terminal. A reference voltage network including resistors 256, 257 and 258 is connected in series and between the DC supply line L12 and a DC return L15 which is connected to ground and therefore represents the AC return of L13. The resistor 259 is a potentiometer having the variable wiper terminal connected to one of the end terminals so that the potentiometer acts as a variable resistor. The junction between the resistors 257 and 258 is connected to the negative input of amplifier 252 as a means of inputting a reference voltage thereto. A capacitor 260 is connected between the positive and negative inputs of amplifier 252 for the purpose of removing spurious signals. The output of amplifier 252 is connected through a resistor 256 to both inputs of a dual input AND gate 264. A capacitor 266 is connected between the output and inputs of AND gate 264. A resistor 268 connects the output of AND gate 264 with the negative input of amplifier 252. The AND gate 264 along with the resistors 262 and 268 and capacitor 266 perform the function of changing the reference voltage connected to the negative input of amplifier 252 in the same manner as was performed for the amplifier 48 of FIG. 1. This arrangement differs from that of FIG. 1 in the specific components used and in the number of components which results in some savings over the previous embodiments.

The output for the temperature sensing circuit for the remainder of control circuit 210 is generated through a diode 270, a resistor 272 and a capacitor 274. The diode 270 has its anode connected to the output of AND gate 264. The capacitor 274 and resistor 272 are connected in parallel and have one end thereof connected to the cathode of diode 270 and the other end thereof connected to the DC return line L15. The output is formed on line L16 and appears as the voltage across capacitor 274. A visual output means is also provided for the output of amplifier 252 by means of a pair of NOR gates 276 and 278, a pair of resistors 280 and 282 and a light emitting diode 284. NOR gates 276 and 278 are each dual input gates, but all of the inputs are connected in common and to the output of amplifier 252. The outputs of NOR gates 276 and 278 are also connected in common and through a resistor 280 to the DC supply line L12. Resistor 282 and light emitting diode 284 are connected in series, with the other end of resistor 282 connected to the output of gates 276 and 278 and the cathode of diode 284 connected to the DC return line L15.

The temperature sensing circuit 214 operates somewhat similarly to the temperature sensing circuit 14 of FIG. 1. A set point temperature is determined by the potentiometer 250. The resulting signal at junction L14 is a combination of this set point temperature determination and the output of thermistor probe 246. When the probe temperature is more than the predetermined number of degrees below the set point temperature, the voltage at L14 is higher than the voltage at the negative input of amplifier 252, so the resulting output signal is the positive supply voltage for the amplifier 252. This positive signal is taken as a logical high or one by the input of AND gate 264 and outputted exactly as such. That is, a logical high causes a specific biasing reference voltage to be set up through resistor 268, in combination with resistors 257 through 259, at the negative input of amplifier 252. When the probe temperature passes the secondary temperature, or when it gets closer to the set point temperature than the predetermined number of degrees, the negative input becomes more positive than the positive input of amplifier 252 causing the output of that amplifier to go to the negative supply voltage thereof. In this case, the negative supply voltage is zero volts DC which represents a logical zero. AND gate 264 passes this logical zero or zero volts DC to the resistor 268 which changes the biasing on the negative input to that of the set point temperature. As the probe temperature is probably between the secondary temperature and the set point temperature at this point, the positive input becomes higher than the negative input causing the output of amplifier 52 to go to its positive maximum. This again is passed through the AND gate 264 resulting in another change of the biasing reference voltage for the negative input of amplifier 252. Resistor 262 and capacitor 266 serve to delay the transmission of changes in the output of amplifier 252 to the resistor 268. When the probe temperature reaches the set point temperature, the positive input has a lower value than any possible reference voltage for the negative input of amplifier 252, so the output thereof goes to its negative maximum or zero volts resulting in the biasing for the negative input being changed and held at that which corresponds to the set point temperature. The condition will remain stable as long as the temperature of the probe 246 remains above or substantially equal to the set point temperature.

The visual output displays all conditions of the output of amplifier 252. The NOR gates 276 and 278 invert the signal and act as power amplifiers to supply the light emitting diode 284. When the output of amplifier 252 is high, such as when the thermistor temperature is below the secondary temperature, the output of gates 276 and 278 is low causing the diode 284 to be turned off. When the output of amplifier 252 is at zero volts, the output of gates 276 and 278 is at its positive maximum resulting in power being connected to the light emitting diode 284 and the illumination thereof. When the probe temperature is between the secondary temperature and the set point temperature and the output of amplifier 252 is switching between a positive voltage and zero volts, the light emitting diode is correspondingly blinking on and off to indicate to the operator that the probe temperature has passed the secondary temperature and that the item being heated is almost at the desired set point temperature. Resistor 280 equalizes the power supply current load between the on and off conditions of gates 276 and 278.

The output of the temperature sensing circuit 214 is further used by the remainder of the control circuit 210. To accomplish this, the diode 270 acts in conjunction with resistor 272 and capacitor 274 to output on line L16 only a portion of the output signals of AND gate 264. When the output of 264 remains high, such as when the probe temperature is below the secondary temperature, the diode 270 conducts causing the capacitor 274 to charge. When the output of AND gate 264 is consistently low, such as when the probe temperature is greater than the set point temperature, the diode 270 is cut off and the capacitor 274 slowly discharges through the resistor 272, eventually reducing the voltage on line L16, with respect to line L15, to zero volts. When the output of amplifier 252 and thus the output of gate 264 is switching between high and low signals, the diode 270 conducts during the positive voltage or high signal but does not conduct during the zero volts or low signal. The capacitor 274 charges and discharges, respectively, during this cycling period. However, the voltage on line L16 does not have an opportunity to be reduced to near zero volts until the low signal or zero volts appears at the output of gate 264 for some time. This is because the capacitor cannot sufficiently discharge in the short time period of the oscillations. The resulting output on line L16 is a logical high signal during that time when the probe temperature is less than the set point temperature and a low logical signal when the probe temperature is greater than or substantially equals the set point temperature.

The duty cycle control section 216 generally includes the same form of R-C time constant circuit as FIG. 1. The time constant circuit includes a capacitor 290 connected in series with a resistance network having resistors 291 through 295. The resistors 291 through 295 are connected in two separate branches; the first including resistors 291 and 292 and the second including resistors 293 through 295. Resistor 292 is connected in series with a diode 296 and that combination is connected in parallel with resistor 291 for the first branch. Resistor 293 is connected in series with diode 298, and resistor 294 is connected in series with diode 300. The other ends of resistors 293 and 294 are each connected to an opposite fixed terminal of potentiometer 295. The other ends of diodes 298 and 300 are connected together and along with one end of the other branch are connected to the capacitor 290. Each of the separate branches is connected to an output terminal "c" of one of the digitally controlled analog transmission gates 302 and 304. The gates 302 and 304 are similar to the gates 90 and 92 of FIG. 1 and are driven by the output signal on line L16. L16 is connected directly to the control terminal "a" of gate 302 and through an inverter 306 to the control terminal "a" of gate 304. An AND gate 308 has its output connected to the end of capacitor 290 opposite the resistance network. One input of AND gate 308 is connected to the connection between capacitor 290 and the resistance network. The output of AND gate 308 is connected to one input terminal of a NOR gate 310. The other input of NOR gate 310 is connected to the DC return of L15 thus causing NOR gate 310 to operate as an inverter. The output of NOR gate 310 is connected to the input terminals "b" of gates 302 and 304. The output of AND gate 308 is also connected through a diode 312 to its other input.

A crest detection circuit for causing the microwave power source to be energized at a voltage peak of the alternating voltage supply is composed of a capacitor 314, a resistor 316 and a transistor 318. The capacitor 314 and resistor 316 are connected in parallel and between the junction of resistors 222 and 224 and the base of transistor 318. The emitter of transistor 318 is connected to the DC return of L15 and a resistor 320 connects the collector of transistor 318 to the regulated DC supply of L12. The collector of transistor 318 is also connected to the input of NOR gate 321; the output of which is connected through a resistor 322 to one of the inputs of AND 308 for transmitting the crest detection signal into the control circuitry. Another input of NOR gate 321 is connected to the output of AND gate 308. A diode 324 is connected between the regulated DC voltage line of L12 and the junction of capacitor 290 and the resistance network. The diode 324 is reversed biased while the DC line L12 is energized but becomes forward biased and serves to discharge capacitor 290 when the circuit 210 is deenergized and the transistor 242 temporarily becomes conductive. The output of AND gate 308 is further connected through a diode 326 to all inputs of a pair of AND gates 328 and 329. The outputs of gates 328 and 329 are similarly connected in common and through a resistor 330 to the regulated DC supply of L12. A capacitor 332 is connected across the gates 328 and 329 from their common input to their common output. A resistor 334 is connected between th common input of those gates to the DC return of L15, and a resistor 336 is connected from the common outputs of gates 328 and 329 to the light emitting diode input of an optically coupled triac 338. The other input of optically coupled triac 338 is connected to the DC return of L15. The output terminals of triac 338 are connected on one hand to an output terminal L17 and on the other hand through a resistor 340 to another output terminal L18. A resistor 342 and a capacitor 344 are connected in series and across the main output terminals of optically coupled triac 338. The output terminals L17 and L18 may be used to contol the heat source of a microwave oven or other heating device in any suitable manner. One arrangement is commonly known and is that which is shown in FIG. 1.

In operation, the R-C time constant section 216 and the output section 218 operate in the following manner. As mentioned, the capacitor 290 is made to charge and discharge through resistors 291 through 295. This charging and discharging is controlled by AND gate 308, inverter 310 transmission gates 302 and 304 and diodes 296, 298 and 300. As mentioned, the output of AND gate 308 is inverted by the NOR gate or inverter 310 and fed to the input terminals of transmission gates 302 and 304. The condition of the signal on line L16 determines which of the gates 302 and 304 will be open and which will be closed. In the event that the probe temperature is below the set point temperature, the output of the temperature sensing circuit on line L16 will be a logical high signal which will cause transmission gate 304 to be on or open and transmission gate 302 to be closed or off. This will cause the capacitor 290 to charge and discharge through the resistors 293 through 295. The setting of potentiometer 295 will determine the respective resistances of each branch of that newwork and thus will determine the respective time constant for each of the charging and discharging processes. When the probe temperature has reached the set point temperature, the circuit will switch into the "keep warm" mode and the signal on line L16 will be a logical low. This will cause transmission gate 302 to turn on or open and transmission gate 304 to turn off or close. Thus, in the "keep warm" mode, the capacitor 290 will charge and discharge through resistors 291 and 292. The direction of the current to and from the capacitor 290 is controlled by the AND gate 308. When the output of gate 308 is high, the output of inverter 310 will be low and the side of the capacitor 290 nearest the output of gate 308 will gain in positive charge. When the output of gate 308 is low, the output of inverter 310 will be high and the side of the capacitor 290 nearest the output of gate 308 will lose positive charge or gain negative charge.

The operation of gate 308 is tied into the signal from the voltage crest detector of transistor 318. Capacitor 314 and resistor 316 connect the base of transistor 318 to a small DC signal having an AC component therein. This AC component causes the transistor 318 to switch on in close proximity to the voltage crest of the input alternating voltage waveform. This sends a logical low signal to the input of NOR gate 321 in close proximity to the voltage crest and a logical high signal at other times. While the output of AND gate 308 is high, diode 312 will hold one input of AND gate 308 high even though the output of NOR gate 321 is low. In this case, the switching of the AND gate 308 output to a low will depend upon the charge across capacitor 290. While the output of AND gate 308 is low, the output of NOR gate 321 will depend upon transistor 318. During a greater portion of the line cycle, transistor 318 will be turned off presenting a logical high to the input of NOR gate 321. This will cause the NOR gate 321 output to be low. Twice during the line cycle, a voltage crest will occur, which will turn transistor 318 on presenting a logical low at the NOR gate 321 input. This will cause the output of NOR gate 321 to go from a low to a high. If the voltage charge on capacitor 290 is sufficient to drive its respective input of AND gate 308 high when the logical high appears at the NOR gate 321 output, the output of AND gate 308 will switch from a low to a high. As this logic change represents energization of the microwave power source, this energization will only occur during a coincidental voltage crest in the supply line and the proper charge condition of capacitor 290. The logical high signal from AND gate 308 passes through diode 312 and clamps the respective input of AND gate 308 to a logical high so that AND gate 308 will not switch once the crest of the alternating voltage source is passed. With reverse voltage applied to capacitor 290, that capacitor will discharge through diode 298 and resistor 293 and 295 until the voltage at the connection between capacitor 290 and 298 reduces below the logical high level of the input of AND gate 308. At this point, the output of gate 308 will change to a logical low, which will reverse the discharging process of capacitor 290 causing it to recharge through diode 300 and resistors 294 and 295. This will raise the voltage between the capacitor 290 and diode 300 to above the logical one; however, since the logical high signal at diode 312 was lost, the AND gate 308 will not switch from a logical low to a logical high until another voltage crest is detected and a high signal is transmitted from NOR gate 321.

The output of AND gate 308 is transmitted by AND gates 328 and 329 to the triac 338 and thus causes the power source to be energized during the portions when the output of gate 308 is a logical high. Similarly to circuit 10 of FIG. 1, the "on" portion of the duty cycle will be expanded slightly by the action of capacitor 332. This is the "100% makeup" function referred to in reference to FIG. 1.

Figure 3:
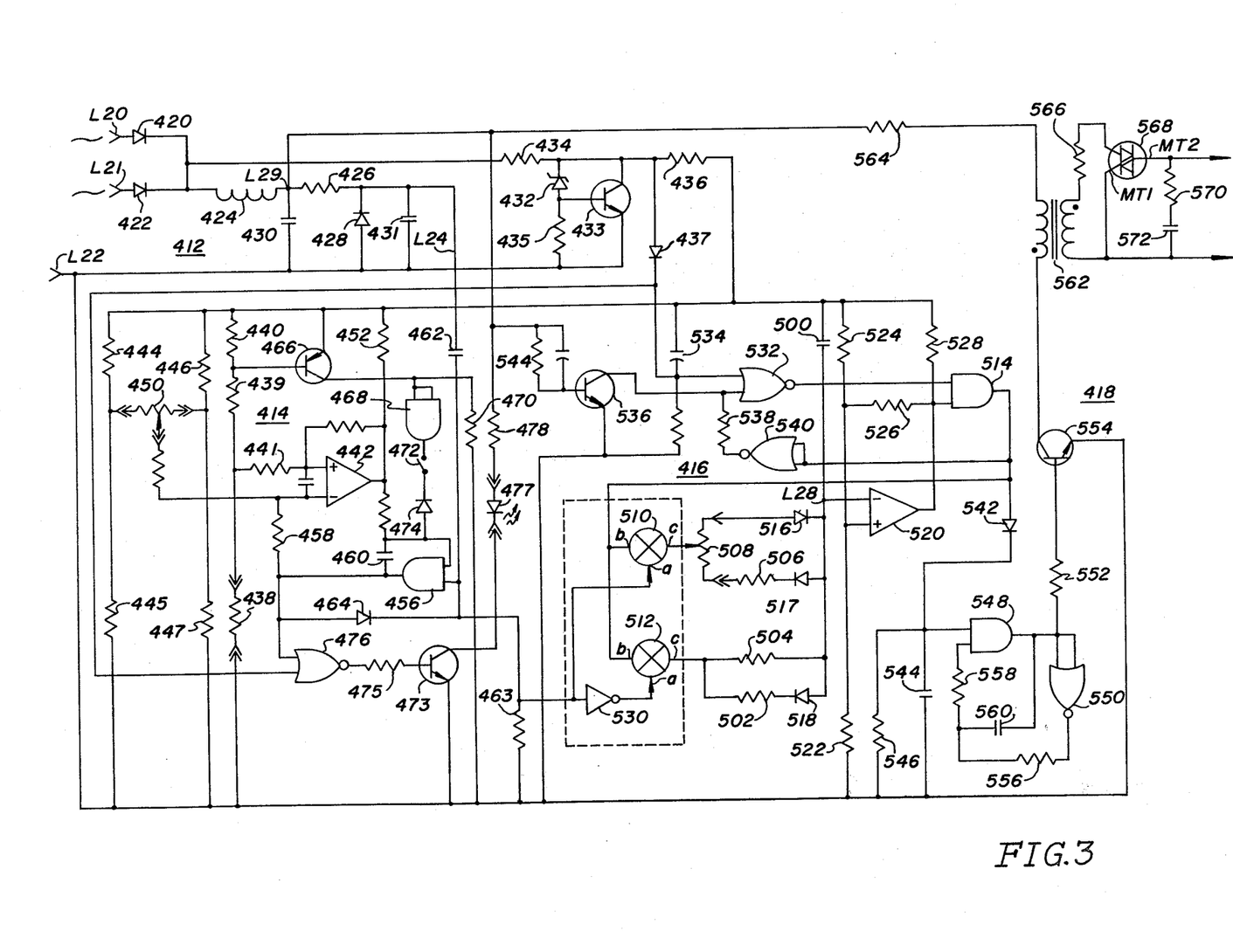
FIG. 3 is a schematic diagram of another microwave oven control circuit including another embodiment of the present invention.

FIG. 3 is a schematic diagram of a control circuit 410 for a microwave oven which includes another embodiment of the present invention. The control circuit 410 generally includes a power supply section 412, a temperature sensing circuit 414, a duty cycle control section 416 and an output section 418.

More specifically, the power supply section 412 includes input terminals L20, L21 and L22 for connection of the circuit to two sources of alternating voltage at L20 and L21 and a common ground at L22. Diodes 420 and 421 have their cathodes connected in common and their anodes connected to separate ones of the input terminals L20 and L21 for rectifying the alternating voltage there presented. The rectified alternating voltage signal appears at terminal L23 to which is connected one end of an inductance coil 424. A resistor 426 and a zener diode 428 are connected in series and across the other end of inductance 424 and the AC return of L22. Resistor 426 acts as a voltage reducing resistor and zener diode 428 is reversed biased to form a regulated voltage supply. One typical value for the reverse bias voltage of zener diode 428 is 9.1 volts. A capacitor 430 is connected in parallel with the combination of resistor 426 and diode 428 between the coil 424 and the AC return L22. Another capacitor 431 is connected in parallel with the zener diode 428. The regulated voltage supply is provided on line L24 with a DC return line of L22.

The power supply section 412 is also provided with over-voltage protection in the form of a zener diode 432 and a transistor 433. A resistor 434 connects the cathode of zener diode 432 to the output of rectifying diodes 420 and 422. A resistor 435 connects the anode of zener diode 432 to the AC return of L22. The base of transistor 433 is connected to the connection between zener diode 432 and resistor 435. The emitter of transistor 433 is connected to the AC return of L22 and the collector is connected to the cathode of zener diode 432. In the event that the voltage from the AC input goes too high, the zener diode 432 conducts causing the transistor 433 to conduct and shunt the DC voltage on L26 to ground. A resistor 436 connects the protected DC voltage of L26 to the main supply line L27 for the components of circuit 410. A diode 437 connects L26 directly to an input of NOR gate 476.

The temperature sensing section 414 is designed to operate with a thermistor temperature probe 438. The probe 438 is connected in series with a pair of resistors 439 and 440 and across the regulated voltage potential from L24 to L22. The connection between probe 438 and resistor 439 is coupled via another resistor 441 to the positive input of an operational amplifier 442. The negative input of amplifier 442 is connected to a biasing circuit which provides a source of reference voltage against which the output of the probe network is compared by amplifier 442. The biasing network includes resistors 444 through 448 and a potentiometer 450. A bridge network is formed with resistor 444 connected in series with resistor 445 and resistor 446 connected in series with resistor 447. Each of these series networks is connected across the regulated supply of lines L24 and L22. The fixed terminals of potentiometer 450 are each connected to a separate median connection point for the two series networks. Resistor 448 connects the variable wiper terminal of potentiometer 450 to the negative input of amplifier 442. The setting of potentiometer 450 represents the set point temperature against which the probe temperature is compared. The output of amplifier 442 is connected via a resistor 452 to the regulated DC supply of L24 and through another resistor 454 to an input of an AND gate 456. The output of AND gate 456 is connected to the negative input of amplifier 442 via a resistor 458, and a capacitor 460 connects the output of AND gate 456 to the same input as resistor 454. A capacitor 462 connects the other input of AND gate 456 to the positive DC potential of L24 and a diode 464 is connected between that same input of AND gate 466 and the output thereof, having its anode connected to the latter. Circuit means for sensing high impedance in the probe 434 includes a transistor 466 and an AND gate 468. Transistor 466 is a PNP transistor having its emitter connected to the positive DC supply of L24, its base connected to the connection between resistors 436 and 438 and its collector connected to both inputs of AND gate 468. A resistor 470 connects the collector of transistor 466 to the DC return of L22. The output of AND gate 468 is connected through an external switch 472 to the cathode of a diode 474. The anode of diode 474 is connected to one of the inputs of AND gate 456.

In operation, the temperature sensing section 414 performs in the following manner. The setting of potentiometer 450 determines a set point temperature which is connected to the negative input of operational amplifier 442. As the probe temperature rises the voltage at the positive input of amplifier 442 falls from a positive maximum towards zero volts. During this period, the voltage at the positive input is higher than that at the negative input and so the output of amplifier 442 is a positive voltage which appears as a logical one at the input to AND gate 456. For this reason, the output of AND gate 456 is also a logical one causing diode 464 to be forward biased which makes the output of section 414 at L24 also a logical one. During this time, capacitor 462 gains very little charge as both sides of it are at a positive voltage level. The logical one at the output of AND 456 contributes to the biasing of the negative input of amplifier 442 through resistor 458. The combined effect of this biasing represents the secondary temperature or a temperature which is a predetermined number of degrees away from the set point temperature. When the probe temperature reaches the set point temperature and goes higher, the voltage presented at the positive input of amplifier 442 becomes less than that presented at the negative input causing the output to switch to the negative maximum or, in this case, zero volts. This, in turn, causes the output of AND gate 456 to go to a logical zero which affects the biasing of the negative input through resistor 458 to cause the voltage presented thereat to represent the set point temperature instead of the previously represented secondary temperature. Also, the logical zero output of AND gate 456 causes diode 464 to turn off and allows capacitor 462 to charge through resistor 463. The value of resistor 463 is chosen rather large which results in the logical high signal at L25 to remain for some time.

When the probe temperature is between the secondary temperature and the set point temperature, the change of biasing from the secondary temperature to the set point temperature causes the reference voltage at the negative input to be lower than the voltage at the positive input and thus the output of amplifier 442 switches back to the positive voltage or a logical one. This in turn changes the output of AND gate 456 to a logical one and again forward biases diode 464 to insure that the output at terminal L25 does not decay below a minimum voltage level representing a logical one output. Of course, the changing of the output of AND gate 456 from a logical zero to a logical one rebiases the negative input of amplifier 442 to again represent the secondary temperature. This again causes the output of amplifier 442 to switch negative. Thusly, the output of amplifier 442 oscillates between the positive maximum and the negative maximum while the temperature of the probe is between the secondary temperature and the set point temperature. The purpose of capacitor 460 and resistor 454 is to slow these oscillations. When the output of amplifier 442 changes from zero to a positive voltage, capacitor 460 must be charged through resistor 454 before that positive voltage appears at the input of AND gate 456. Likewise, when the output of amplifier 442 changes from a positive voltage to zero volts, capacitor 460 must charge through resistor 454 before a logical zero appears at the input of AND gate 456. Because of the effect of diode 464, capacitor 462 and resistor 463, the output at L25 does not have an opportunity to decay below a minimum positive voltage level representing a logical one: When the probe temperature does pass the set point temperature, the voltage at the positive input of amplifier 442 remains below whatever voltage is made to appear at the negative input of amplifier 442. Therefore, the output remains at the negative maximum of zero volts and diode 464 remains switched off. This allows capacitor 462 to change slowly through resistor 463 and allows the output of terminal at L25 to decay to a logical zero output.

Under normal conditions, connection of the probe 434 to the temperature sensing circuit will cause a nominal amount of current to flow through resistors 436 and 438. This amount of current is sufficient to forward bias the base emitter junction of transistor 466 causing a positive voltage or a logical high to appear at the inputs to AND gate 468. External switch 472 is normally closed when the probe is connected so the logical high will be presented at the diode 474 side of switch 472. In the event that the probe is faulty or inoperative, it will have a higher resistance than normal and cause a much lower current to flow through resistor 438. The results will be that transistor 466 will be turned off and a logical low will be presented at the input to AND gate 468. As a result of this, the output will be a logical low which will clamp the input of AND gate 456 connected to resistor 454 to a logical low. This will result in a logical low appearing at output L25, which the remainder of the control circuitry will follow keeping the power for the microwave power source at a low level. By these means, the probability of overcooking caused by a faulty temperature probe is greatly reduced. Furthermore, the related danger of creating a fire hazard is greatly reduced.

The temperature sensing circuit 414 is also provided with a visual indicator in the form of a light emitting diode 470. The diode is controlled by a transistor 472, a resistor 474 and a NOR gate 476. The input to NOR gate 476 is connected to the output of AND 456. The output of NOR gate 476 is connected through resistor 474 to the base of transistor 472. The emitter of transistor 472 is tied to the DC return of L22 and the collector of transistor 472 is connected to the cathode of light emitting diode 470. A resistor 478 connects the anode of diode 470 to a DC voltage source. When the output of AND gate 456 is high, the transistor 472 is turned off causing the LED 470 to not light. When the output of AND gate 456 is a logical zero, the transistor 472 is turned on causing LED 472 to illuminate.

The duty cycle control section 416 generally includes a capacitor 500 coupled in series at L28 with a resistance network including resistors 502, 504, 506 and 508 to form an R-C time constant circuit. The other end of capacitor 500 is connected to the DC source of L27, and the other ends of the resistors are connected to output terminals "c" of a pair of bilateral semiconductor transmission gates 510 and 512. The inputs "b" of transmission gates 510 and 512 are connected in common and to the output of an AND gate 514. Diodes 516, 517 and 518 are connected in the resistance network to control the resistors through which the capacitor 500 charges and discharges. The output of the R-C time constant circuit is taken from L28 and is connected to the negative input of an operational amplifier 520 which is adapted to operate as a voltage comparator. The output of amplifier 520 is connected to one of the inputs of AND gate 514. A voltage divider including resistors 522 and 524 is connected between the DC supply line of L27 and the DC return L22. The junction between resistors 522 and 524 is connected to the positive input of amplifier 520. Another resistor 526 is connected between the positive input and the output of amplifier 520. A resistor 528 connects the regulated DC supply of L27 to the output of amplifier 520. The transmission gates 510 and 512 are controlled by the digital signal present at their terminal "a", which signal is derived from the output of the temperature sensing circuit on L25. L25 is connected to the control terminal "a" of transmission gate 510 and to the input of an inverter 530. The output of inverter 530 is connected to the control terminal "a" of transmission gate 512. The other input of AND gate 514 is connected to the output of a NOR gate 532. One input for NOR gate 532 is derived from the cathode of diode 437 and through a capacitor 534 from the positive DC voltage line L27. The other input of NOR gate 532 is derived from the collector of a transistor 536 and through a resistor 538 from the output of another NOR gate 540. The emitter of transistor 536 is connected to the DC return L22. Its base is connected through a parallel R-C network, including a capacitor 542 and a resistor 544, to the voltage source of L29. The input of NOR gate 540 is derived from AND gate 514.

The duty cycle control circuit further includes a 100% makeup circuit including a diode 542 having its anode connected to the output of AND gate 514 and its cathode connected to a parallel R-C circuit including a capacitor 544 in parallel with a resistor 546. The other end of the parallel resistor/capacitor combination is connected to the DC return of L22. The 100% makeup circuit adds a small delay to the output of AND gate 514 as it goes from a logical high to a logical low. At this switching point, the diode 542 turns off and the capacitor 544 maintains a logical one or a positive DC voltage thereacross for a short period as it discharges through resistor 546. In the full power mode, this makes the duty cycle of the time constant circuit 416 appear to be 100%. It also adds approximately one percentage point to the lower power settings of the potentiometer 508 and the "keep warm" function of resistors 502 and 504.

The output of AND gate 514 is further connected through diode 542 to the input of AND gate 548. The output of AND gate 548 is connected to both inputs of a dual input NOR gate 550 and through a resistor 552 to the base of transistor 554. The output of NOR gate 550 is connected through resistors 556 and 558 to the other input of AND gate 548. A capacitor 560 is connected between the output of AND gate 548 and the connection between resistors 556 and 558. The emitter of transistor 554 is connected to the DC return of L22. The collector of transistor 554 is connected through the primary coil of a transformer 562 in series with a resistor 564 to the voltage source of L29. The secondary coil of transformer 562 is connected on one side through a resistor 566 to the gate terminal of a triac 568 and on the other side to the main terminal MT1 of triac 568. A series connected resistor 570 and capacitor 572 are connected between the main terminals MT2 and MT1 of triac 568. The control output is provided by the main terminals MT1 and MT2 of triac 568 at output terminals L29 and L30.

In operation, the time constant section 416 and the output section 418 function in the following manner. Signals from L25 of the temperature sensing section 414 dictate whether the oven will operate in the "full power" mode or in the "keep warm" mode. In the former, the duty cycle and thus the power level is variable between 36 and 100 percent. In the "keep warn" mode, the duty cycle is fixed at approximately 36%. In the "full power" mode, the capacitor 500 will charge through that portion of potentiometer 508 between its variable terminal and diode 517, resistor 506 and diode 517, and discharge through the remainder of potentiometer 508 and diode 516. In the "keep warm" mode, the capacitor 500 will charge through resistors 504 and 502 and discharge through resistor 504.

The actual charging and discharging of capacitor 500 is controlled by the output of AND gate 514. When this output is logically low or zero volts, capacitor 500 will charge until the voltage at L28 drops below the reference voltage at the positive input of amplifier 520. When this occurs, the output of amplifier 520 goes positive. At the next occurrence of a voltage crest in the line cycle, a positive voltage is fed to the base of transistor 536 causing it to conduct. This connects one input of NOR gate 532 to ground causing the output thereof to switch to a logical high. This logical high, in combination with the positive voltage output of amplifier 520, causes the output of AND gate 514 to switch from a low to a high. This high is inverted to a low by NOR gate 540 to hold the input of NOR gate 532 to a low when the voltage crest of the line cycle passes and transistor 536 goes nonconductive. The logical high output of AND gate 514 also causes capacitor 500 to discharge instead of charge.

The reference voltage against which the charge of capacitor 500 is compared is determined by resistors 522, 524 and 526. When the output of amplifier 520 is zero volts and capacitor 500 is charging the reference voltage is at its lowest level. When the output of amplifier 520 is a positive voltage and capacitor 500 is discharging, the reference voltage is at its highest level. In this manner, capacitor 500 charges forcing the voltage at L28 to go lower and lower until the lowest reference voltage is reached. At this point, the output of amplifier 520 goes positive and capacitor 500 begins to discharge. The discharge process continues until the voltage at L28 rises to the highest reference level.

As mentioned, the combination of diode 542, resistor 546 and capacitor 544 extends the "on" portion of the duty cycle by approximately 1%. The logical high outputs from AND gate 514 are thusly transmitted to the base of transistor 554 where they activate transistor 554 and the primary coil of transformer 562. In this manner, the gate of triac 568 is energized and terminals L29 and L30 are connected together. When terminals L29 and L30 are connected in series with line voltage for a microwave power source, they can be used to control the application of power thereto.

Figure 4:
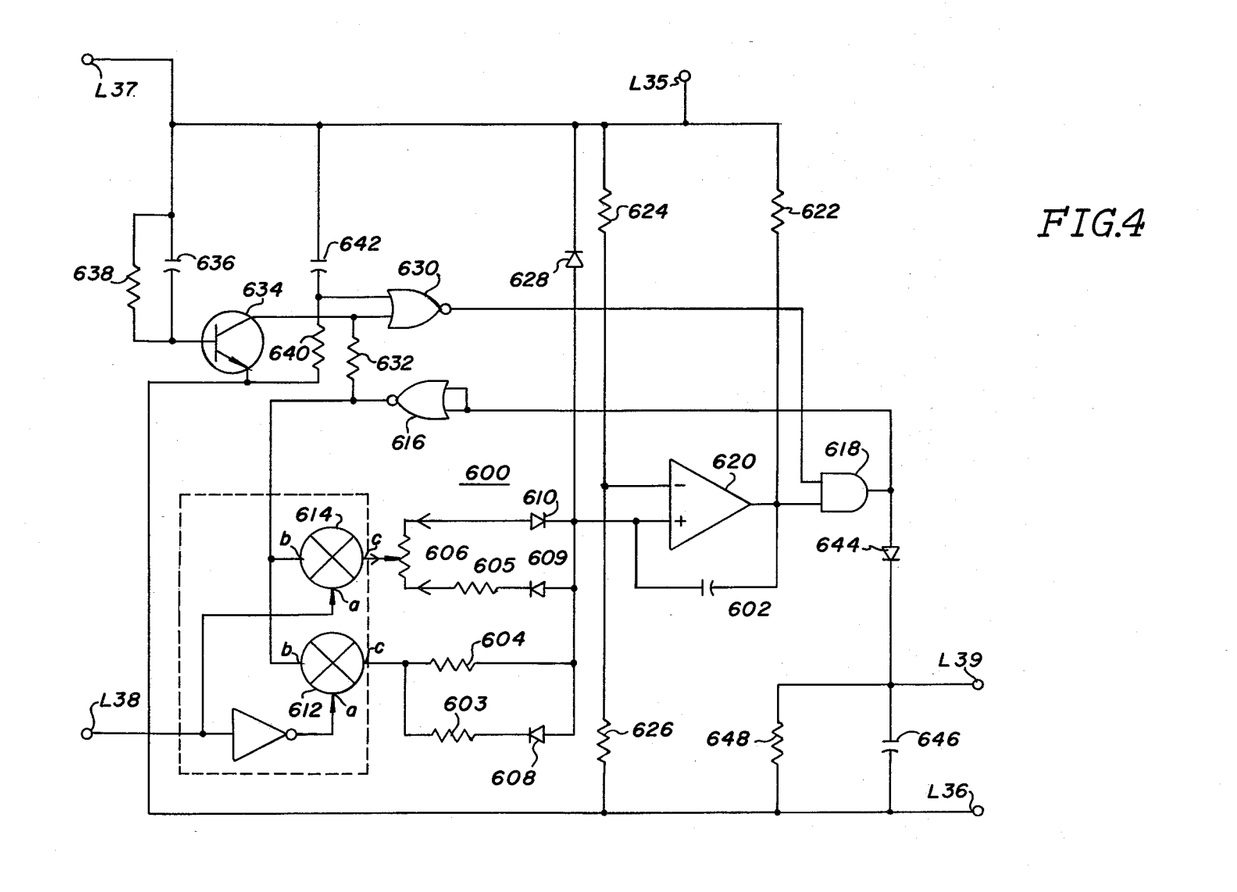
FIG. 4 is a schematic diagram of a portion of a microwave oven control circuit including yet another embodiment of the present invention.

FIG. 4 is a schematic diagram of a duty cycle control section 600 including yet another embodiment of the present invention. The duty cycle control section 600 is intended for use with a microwave oven control system similar to those shown in FIGS. 1 through 3. Power is connected to the circuit 600 via terminal L35 for a positive DC voltage, L36 for a DC return, L37 for a low level ripple current having the same phase as the alternating current supply, L38 as an input indicating whether the circuit should operate in the "full power" mode or in the reduced power "keep warm" mode and L39 as an output for control of the microwave power source.

The duty cycle control circuit 600 generally includes an R-C time constant circuit having a capacitor 602 which is connected in series at L40 to a plurality of resistors 603 through 605 and potentiometer 606. The time constant for the circuit varies according to which resistors are used to charge and discharge the capacitor 602. Diodes 608, 609 and 610 control the direction of current flowing through the individual resistor branches, and bilateral semiconductor transmission gates 612 and 614 determine which of the two distinct resistance branches will be used to determine the time constant for the circuit. The first resistance branch including resistors 605 and 606 and diodes 609 and 610 is connected to the output terminal "c" of transmission gate 614. The other branch of resistors including resistors 603 and 604 and diode 608 are connected to the output terminal "c" of transmission gate 612. The input terminal "b" of transmission gates 612 and 614 are connected in common to the output of a NOR gate 616. NOR gate 616 includes two inputs which are connected in common and to the output of an AND gate 618. An operational amplifier 620 has its positive input connected to the connection point L40 of the R-C time constant circuit and its output connected to one of the inputs of AND gate 618. The end of capacitor 602 opposite the connection point L40 is also connected to the output of amplifier 620. A resistor 622 connects the output of amplifier 620 to the DC supply of L35. A voltage divider including resistors 624 and 626 is connected between the DC supply of L35 and the DC return of L36, and their point of interconnection is connected to the negative input of amplifier 620. Resistors 624 and 626 thus form a fixed reference voltage for the negative input of amplifier 620. By this arrangement, amplifier 620 is used as a voltage comparator. A diode is connected by its anode to connection point L40 and by its cathode to the positive DC supply line of L35. Diode 628 provides a path for the discharge of capacitor 602 upon deenergization of the circuit in a manner similar to that described for FIG. 2. The other input of AND gate 618 is derived from the output of a NOR gate 630 which includes one input connected by a resistor 632 to the output of NOR gate 616. The same input is also connected to the collector of a transistor 634. The emitter of transistor 634 is connected to the DC return of L36. The base of transistor 634 is connected via a parallel R-C circuit including a capacitor 636 and a resistor 638 to the low level ripple input of L37. A high value resistor 640 connects the emitter of transistor 634 to the other input of NOR gate 630, which other input is connected via a capacitor 642 to the regulated DC supply of L35. The output of AND gate 618 is connected through a diode 644 to the output terminal L39 which is connected via a parallel RC circuit including a capacitor 646 and a resistor 648 to the DC return of L36.

In operation, the time constant circuit 600 functions in the following manner. Whether the circuit 600 determines the time constant for the "full power" mode or for the "keep warm" mode is determined by the logical input signal on L38. A logical high engages the "full power" mode by opening gate 614 and causing the capacitor 602 to discharge through resistor 605, diode 609 and a portion of potentiometer 603, and to charge through diode 610 and a portion of potentiometer 606. A logical low at L38 closes gate 614 and opens gate 612 causing capacitor 602 to discharge through resistors 603 and 604 and diode 608 and to charge through resistor 604.

Capacitor 602 charges and discharges in response to the output of amplifier or voltage comparator 620. When capacitor 602 is discharged, the output of amplifier 620 is zero volts. The outputs of AND gate 618 and inverter 616 are responsively low and high respectively. This causes capacitor 602 to charge until the voltage at the positive input is equal to the voltage determined by the voltage divider of resistors 624 and 626. In one embodiment, the regulated DC voltage applied to terminal L35 is approximately 9 volts and the value of resistor 624 equals the value of resistor 626. This provides a reference voltage to the negative input of amplifier 620 of approximately 4.5 volts. Thus, when the output of amplifier 620 is zero volts and capacitor 602 charges up to present a positive 4.5 volts at the positive input of amplifier 620, the output of amplifier 620 switches from the negative maximum of zero volts to the positive maximum of approximately 9 volts.

When the output of amplifier 620 goes to its positive maximum, it enables AND gate 618 to switch from a logical low at its output to a logical high at the occurrence of the next voltage crest of the line cycle. When this voltage crest occurs, transistor 634 becomes conductive, connecting a logical zero to one input of NOR gate 630. This causes the output of NOR gate 630 to go high thus providing two logical highs at the input of AND gate 618. This causes the output of AND gate 618 to to high which is inverted by NOR gate 616 to a logical low. This logical low is fed by resistor 632 to the collector of transistor 634 to hold the output of NOR gate 630 high after the voltage crest is past. The logical low output of NOR gate 616 is also coupled through one of the transmission gates 612 or 614 for causing the capacitor 602 to discharge.

When the output of amplifier 620 switches to the positive maximum of 9 volts, the charge on capacitor 602 is cumulative, causing the voltage at the positive input to equal approximately 13.5 volts. When the charge on capacitor 602 changes sufficiently to cause the positive input of amplifier 602 to equal 4.5 volts, the reference voltage, the output of amplifier 620 will once again switch to its negative maximum of zero volts. This will set the output of AND gate 618 to a low and the output of NOR gate 616 to a high responsively. At this point, the charge on capacitor 602 is a negative 4.5 volts for the positive input of amplifier 620 with respect to its output. Thusly, in each charging or discharging cycle of capacitor 602, the voltage thereacross changes a full 9 volts.

In a manner similar to that of the previous embodiment, the output of AND gate 618 is transmitted to the output terminal L39 with a 1% extension of the positive portion of the duty cycle caused by the interaction of diode 644, capacitor 646 and resistor 648.

Thusly, the present invention provides an improved form of time-constant circuit which integrates digital and analog functions by using digital voltage levels as charge and discharge references for the time constant circuit. This simplifies the necessary circuitry and allows easy integration therewith of other control functions.

The present disclosure is related in subject matter to two other patent applications filed of even date herewith, by the same inventor herein, and entitled Temperature Sensing Circuit Means and Method, and Temperature Sensing Circuit Including Means For Detecting a Faulty Temperature Probe, the disclosures of which are hereby incorporated by reference herein.

The present invention is shown and described above in reference to the present embodiments which are to be taken in an illustrative and not a limiting sense. It is understood that various modifications and changes may be made to the disclosed embodiments by someone skilled in the art, without departing from the scope of the present invention.

What is claimed is:

1. In a time constant circuit of the type having a resistance-capacitance circuit including a capacitor and a resistance network connected in series with said capacitor, wherein the improvement comprises:
   digital gate means having an output and at least one input, said output being electrically coupled to said resistance-capacitance circuit, said digital gate means being adapted to provide a first digital output voltage level for charging said capacitor through said resistance network and a second digital output voltage level for discharging said capacitor through said resistance network; and
   circuit means connected to said input of said digital gate means for controlling said output of said gate means in response to the voltage charge of said capacitor and including voltage comparator means having an output connected to said gate means input, said comparator means having one input connected to a reference voltage source and another input connected between said capacitor and said resistance network, said reference voltage source including biasing circuit means connected to said voltage comparator means output for biasing said one input of said voltage comparator means in response to said voltage comparator means output, said biasing circuit means including a first pair of resistors connected in series and having one end of said first pair connected to a first fixed voltage potential and another end of said first pair connected to a second fixed voltage potential, said biasing circuit means further including a second pair of resistors connected in series and having one end thereof connected to said first fixed voltage potential and another end thereof connected to the connection between said first pair of resistors, said voltage comparator means output being connected to the connection between said second pair of resistors, and said voltage comparator having a positive input connected to the connection between said first pair of resistors and a negative input connected to the connection between said capacitor and said resistance network with the other end of said capacitor connected to said first fixed voltage potential.

2. In a time constant circuit of the type having a resistance-capacitance circuit including a capacitor and a resistance network connected in series with said capacitor, wherein the improvement comprises:

digital gate means having an output and at least one input, said output being electrically coupled to said resistance-capacitance circuit, said digital gate means being adapted to provide a first digital output voltage level for charging said capacitor through said resistance network and a second digital output voltage level for discharging said capacitor through said resistance network;

circuit means connected to said input of said digital gate means for controlling said output of said gate means in response to the voltage charge of said capacitor; and digital inverter means having an input connected to said output of said gate means and having an output for generating a digital signal opposite to the output signal of said gate means, said resistance-capacitance circuit being connected between said outputs of said gate means and said inverter means.

3. In the time constant circuit of claim 2, wherein said circuit means for controlling said gate means output includes a direct connection between said gate means input and the connection between said capacitor and said resistance network with the other end of said capacitor being connected to said gate means output and the other end of said resistance network being connected to said inverter means output.

4. In a microwave oven of the type having a microwave power source and a time constant circuit for controlling the duty cycle of said microwave power source, said time constant circuit having a resistance-capacitance circuit including a capacitor and a resistance network connected in series with said capacitor, wherein the improvement comprises:

digital gate means having an output and at least one input, said output being electrically coupled to said resistance-capacitance circuit, said digital gate means being adapted to provide a first digital output voltage level for charging said capacitor through said resistance network and a second digital output voltage level for discharging said capacitor through said resistance network;

circuit means connected to said input of said digital gate means for controlling said output of said gate means in response to the voltage charge of said capacitor; and digital inverter means having an input connected to said output of said gate means and having an output for generating a digital signal opposite to the output signal of said gate means, said resistance-capacitance circuit being connected between said outputs of said gate means and said inverter means.

5. A method for controlling the duty cycle of a microwave power source with a time constant circuit having a resistance-capacitance circuit including a capacitor and a resistance network connected in series with said capacitor, comprising the steps of:

biasing said resistance-capacitance circuit with a digital gate means, using a first digital voltage level to charge said capacitor through said resistance network and a second digital voltage level to discharge said capacitor through said resistance network;

controlling the output of said digital gate means in response to the charge on said capacitor; and inverting the output of said digital gate means and using said inverting output and said output connected across said resistance-capacitance circuit to charge and discharge said capacitor.

* * * * *